(12) United States Patent
Huggins et al.

(10) Patent No.: US 9,246,362 B2
(45) Date of Patent: Jan. 26, 2016

(54) ELECTRICAL MOTOR WITH ADJUSTABLE STATOR STACK HEIGHT AND REDUCED YOKE DIAMETER

(71) Applicant: Nidec Motor Corporation, St. Louis, MO (US)

(72) Inventors: Marshall J. Huggins, St. Louis, MO (US); Stephen J. Burton, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 316 days.

(21) Appl. No.: 13/828,839

(22) Filed: Mar. 14, 2013

(65) Prior Publication Data

US 2014/0265715 A1 Sep. 18, 2014

(51) Int. Cl.
| | |
|---|---|
| H02K 1/12 | (2006.01) |
| H02K 15/02 | (2006.01) |
| H02K 1/18 | (2006.01) |
| H02K 1/16 | (2006.01) |

(52) U.S. Cl.
CPC .................. *H02K 1/185* (2013.01); *H02K 1/16* (2013.01); *H02K 2213/09* (2013.01); *Y10T 29/49009* (2015.01)

(58) Field of Classification Search
CPC ........... H02K 15/02; H02K 1/12; H02K 1/16; H02K 1/185; H02K 2213/09; Y10T 29/49009
USPC ........ 310/216.052, 216.055, 216.096; 29/596
See application file for complete search history.

(56) References Cited

U.S. PATENT DOCUMENTS

| | | | | |
|---|---|---|---|---|
| 1,159,121 A | * | 11/1915 | Starker | 310/400 |
| 1,446,898 A | * | 2/1923 | Gysel | 310/216.052 |
| 3,606,674 A | * | 9/1971 | Givan | 29/596 |
| 4,886,990 A | * | 12/1989 | Barker | D06F 37/304 |
| | | | | 310/172 |
| 5,755,023 A | * | 5/1998 | Neuenschwander | 29/596 |
| 5,799,387 A | * | 9/1998 | Neuenschwander et al. | 29/598 |
| 5,877,572 A | * | 3/1999 | Michaels et al. | 310/179 |
| 5,936,320 A | * | 8/1999 | Takeda et al. | 310/89 |
| 6,131,268 A | | 10/2000 | Neuenschwander | |
| 6,274,957 B1 | * | 8/2001 | Mahn et al. | 310/89 |
| 6,509,662 B2 | | 1/2003 | Suzuki et al. | |
| 7,866,030 B2 | * | 1/2011 | Grott et al. | 29/609 |
| 2006/0043815 A1 | | 3/2006 | Miya et al. | |
| 2012/0025656 A1 | | 2/2012 | Liu et al. | |
| 2012/0068566 A1 | | 3/2012 | Miyajima | |

FOREIGN PATENT DOCUMENTS

WO      WO 2012110985 A1 * 8/2012

* cited by examiner

*Primary Examiner* — Alex W Mok
(74) *Attorney, Agent, or Firm* — Maginot Moore & Beck LLP

(57) ABSTRACT

A stator is formed from two stacks of laminations have different outer perimeters to enable electrical motors with different output ratings to be built with a same hub-to-hub distance. The stator includes a first plurality of laminations having a first outer perimeter with at least two flanges with mounting holes, and a second plurality of laminations having a second outer perimeter that is different than the first outer perimeter. The second outer perimeter of the laminations in the second plurality of laminations are configured to enable a portion of an endplate to pass the second plurality of laminations and contact a face of the first plurality of laminations.

20 Claims, 3 Drawing Sheets

ELECTRICAL MOTOR WITH ADJUSTABLE STATOR STACK HEIGHT AND REDUCED YOKE DIAMETER

TECHNICAL FIELD

This disclosure relates generally to electrical motors, and more particularly, to stators used in electrical motors.

BACKGROUND

The manufacture of electrical motors involves a balance of requirements for producing adequate output power without unnecessary expense. Electrical motors are comprised of a rotor that can be axially received within an opening in a stator. The stator typically has teeth that extend into the opening to form a diameter in which the rotor is received. Electrical conductors are mounted about the teeth to enable an electrical current in the conductors to generate a rotating magnetic field. The rotor is configured for rotation in response to the magnetic field generated by the stator. This rotor is fixedly mounted about a shaft that rotates with the rotor. This shaft is held by journal bearings at each end and endplates are mounted about each end of the housing in which the stator and rotor are positioned. The journal bearings hold the rotor in position and mounting members, typically bolts or other threaded members, pass through openings in one of the endplates and mounting holes within an outer portion of the stator to be received in a threaded opening in the other endplate to hold the stator in position. When the endplates are mounted about the rotor shaft and the bolts are received in the stator mounting holes and threaded openings in the endplate, the distance between a hub in one endplate through which the rotor shaft extends and a hub in the other endplate that also includes a journal bearing to hold the rotor shaft defines a hub-to-hub distance for the motor.

Some electrical motors are used in common applications with some variation in the output rating of the motor. For example, clothes dryers use an electrical motor to rotate a drum in which wet clothes are placed for heated air drying. Because the clothes hold water when they are first inserted in the drum, their weight can be significant. Consequently, clothes dryers have output ratings that typically range from ¼ horsepower (HP) to ½ HP. The output power of an electrical motor is related to the length of the rotor and stator in the axial direction of the rotor shaft and the thickness of the stator and the rotor in diameter of those components in a direction that is orthogonal to the axial direction. Holding the thickness of the stator and rotor constant, the length of the rotor and stator should vary as the output rating of the motor changes. This length variation, however, causes the hub-to-hub distance of the motor to change as well. Since the hub-to-hub distance is established by an industry standard, this hub-to-hub distance cannot extend beyond the tolerance range of the standard. Consequently, different output rated motors have stators and rotors of different lengths. Maintaining an inventory of different lengths of stators and rotors can be expensive and complicates the electrical motor manufacturing process. Simplifying the manufacture of electrical motors for different output ratings is desirable.

SUMMARY

A stator that can be adjusted for use in electrical motors of different output ratings uses a stator having two types of stator laminations with different output configurations, one of which removes stator material that lies within a yoke diameter. The stator includes a first plurality of laminations having a first outer perimeter with at least two flanges with mounting holes, and a second plurality of laminations having a second outer perimeter that is different than the first outer perimeter, the second outer perimeter of the laminations in the second plurality of laminations being configured to enable a portion of an endplate to pass the second plurality of laminations and contact a face of the first plurality of laminations.

An electrical motor includes a stator having two types of stator laminations with different output configurations, one of which removes stator material that lies within a yoke diameter. The motor includes an output shaft, a rotor mounted about the output shaft, an endplate with an opening through which the output shaft extends, and a stator secured to the endplate. The stator includes a first plurality of laminations having a first outer perimeter with at least two flanges with mounting holes, and a second plurality of laminations having a second outer perimeter that is different than the first outer perimeter, the second outer perimeter of the laminations in the second plurality of laminations being configured to enable a portion of an endplate to pass the second plurality of laminations and contact a face of the first plurality of laminations.

DETAILED DESCRIPTION

Figure 1:
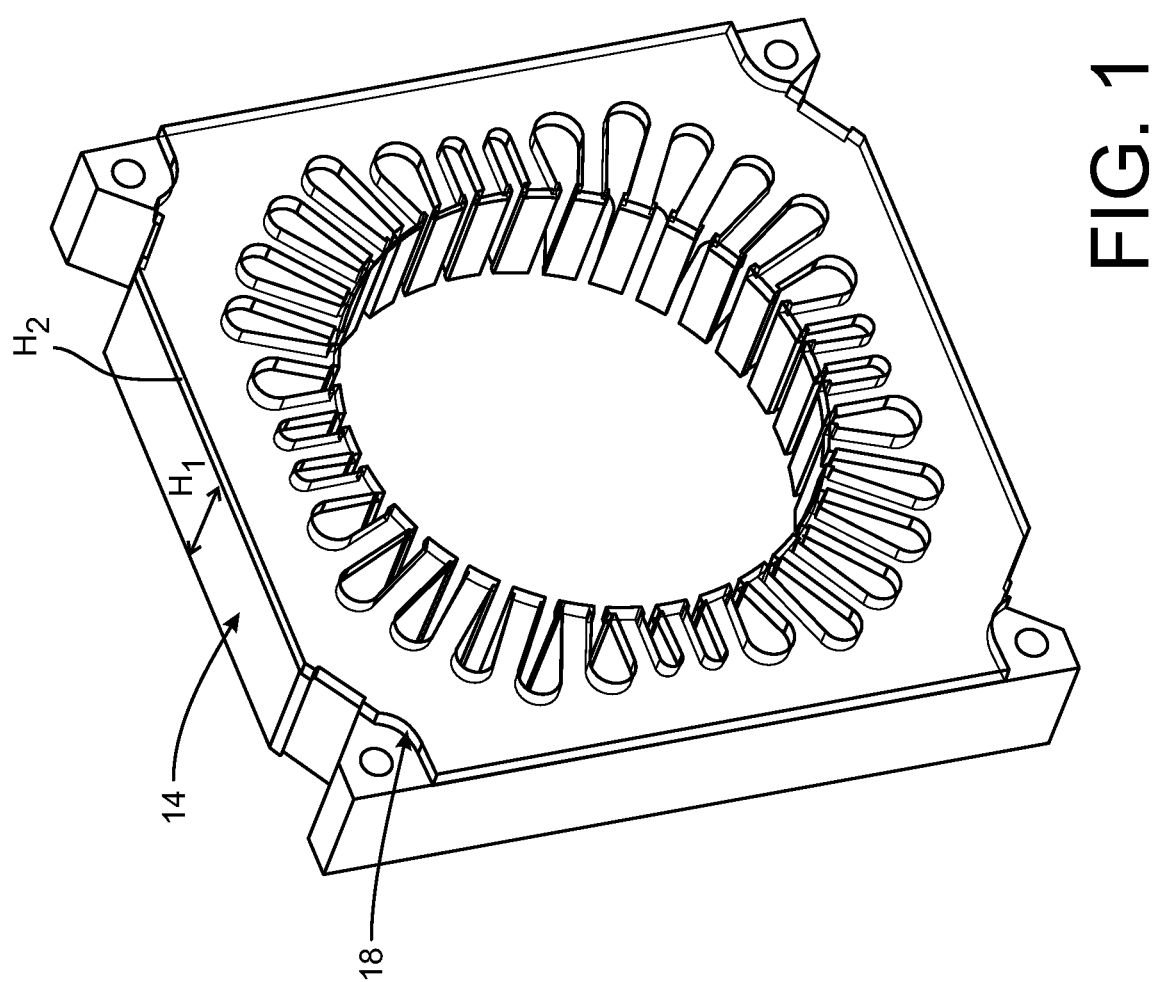
FIG. 1 is a perspective view of a stator formed from two types of laminations with different outer perimeters, one of which is within the yoke diameter of the stator.

FIG. 1 shows a stator 10 that can be configured for use in electrical motors having different output ratings without adversely impacting the hub-to-hub distances in the different motors. The stator 10 is comprised a two stator lamination stacks 14 and 18. The lamination stack 14 is referenced in this document as a base stack and the lamination stack 18 is referenced as an add-on stack. The base stack has a predetermined height $H_1$ regardless of the motor in which the stator 10 is installed, while the add-on stack has a height $H_2$, which varies with the rating of the motor in which the stator is installed. In one embodiment for building electrical motors used in household clothes dryers, the base stack has a height of 0.875 inches and is made of 28 laminations of the thickness used in electrical motors built in accordance with accepted U.S. standards. The add-on stack has a height that varies in the range of about 0.063 inches to about 0.375 inches. The base stack and an add-on stack having a thickness of 0.375 inches are used to form the stator in a 240V, 50 Hz 0.5 HP motor. The base stack and an add-on stack having a thickness of 0.063 inches are used to form the stator in a ⅓ HP motor, while the base stack alone is capable of providing a stack for a ¼ HP motor.

Figure 2:
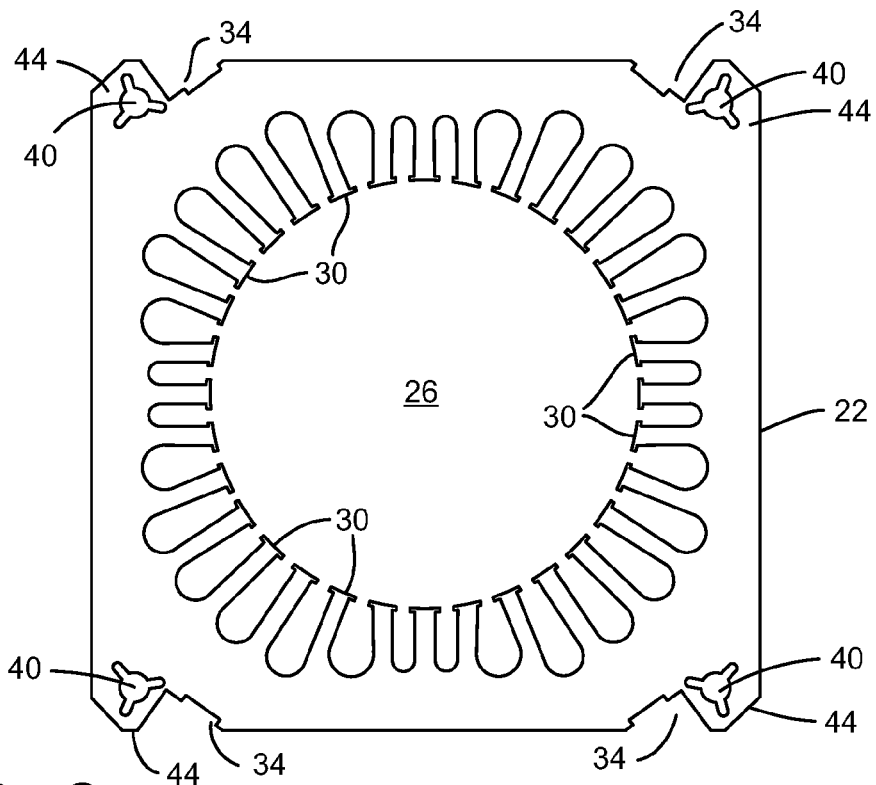
FIG. 2 is a perspective view of a lamination used to form the base stack in the stator of FIG. 1.

The reason that the add-on stack 18 does not alter the hub-to-hub distance of the motor sizes is the ability of one of the endplates to slide past the add-on stack 18 to mate against one face of the base stack 14. The add-on stack does not interfere with the endplate mating against the base stack because the laminations of the add-on stack do not extend out to the edge of the perimeter of the laminations in the base stack. As shown in FIG. 2, a base stack lamination 22 has been punched out of lamination material to include a rotor opening 26 and to form stator teeth 30. Additionally, a cutout 34 is provided at each corner of the lamination to accommodate features in the endplate and a mounting hole 40 is formed in each flange 44 extending from the lamination. A plurality of base stack laminations 22 are then stacked and interlocked to one another in a known manner to form the base stack 14.

Figure 3:
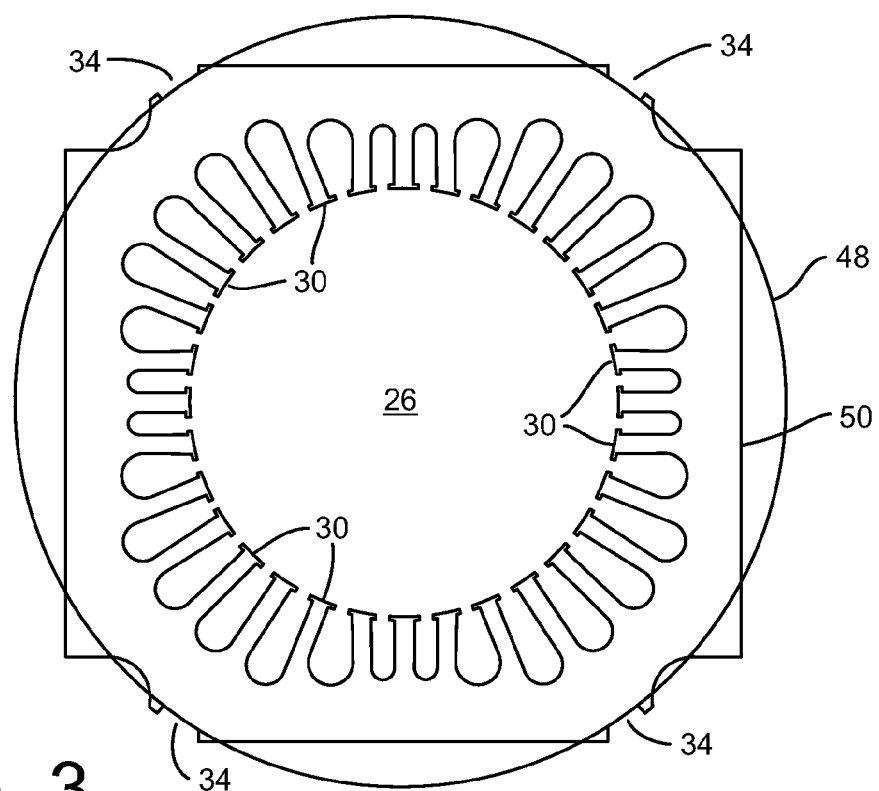
FIG. 3 is a perspective view of a lamination used to form the add-on stack in the stator of FIG. 1.

A lamination 50 for the add-on stack is shown in FIG. 3. The add-on stack lamination 50 has been punched out of the same lamination material as the base stack lamination 22 to include a rotor opening 26 and to form stator teeth 30 as was done in the base stack lamination 22. In addition to cutout 34 at each corner of the lamination 40, the flange 44 has been removed from each corner. The removal of these flanges enables the endplate to move past a lamination 50 because the motor is designed to have the endplate contact a face of the stator to secure the stator to the endplate. Once the flanges are removed, the endplate does not contact any add-on stack surface and moves past the add-on tack to a face of the base stack. A plurality of add-on laminations 50 are then stacked and interlocked to one another in a known manner to form the add-on stack and this add-on stack can be interlocked to the base stack to form a stator 10.

The removal of the flanges 44 is not known in previous electrical motor configurations because such removal takes material away from the yoke diameter of the stator. The yoke diameter, as used in this document, means a diameter measured from the center of the rotor opening in the stator that extends past the teeth of the stator to a position in the lamination material where the electromagnetic flux density in the stator lamination material begins to diminish. A yoke diameter 48 for a stator lamination is shown in FIG. 3. The cutouts 34 in the laminations 22 and 50 do not remove material within the yoke diameter, but the removal of the flange 44, which is required to enable a threaded member to pass the lamination 50 without interference, must remove material within this diameter. Removing material from within the yoke diameter in a stator was previously thought to impact the flux density of the fields generated by the stator too adversely. By removing this material from the add-on stack laminations only, the flux density is not significantly reduced and the ability to form motors with different ratings is enabled.

Figure 4:
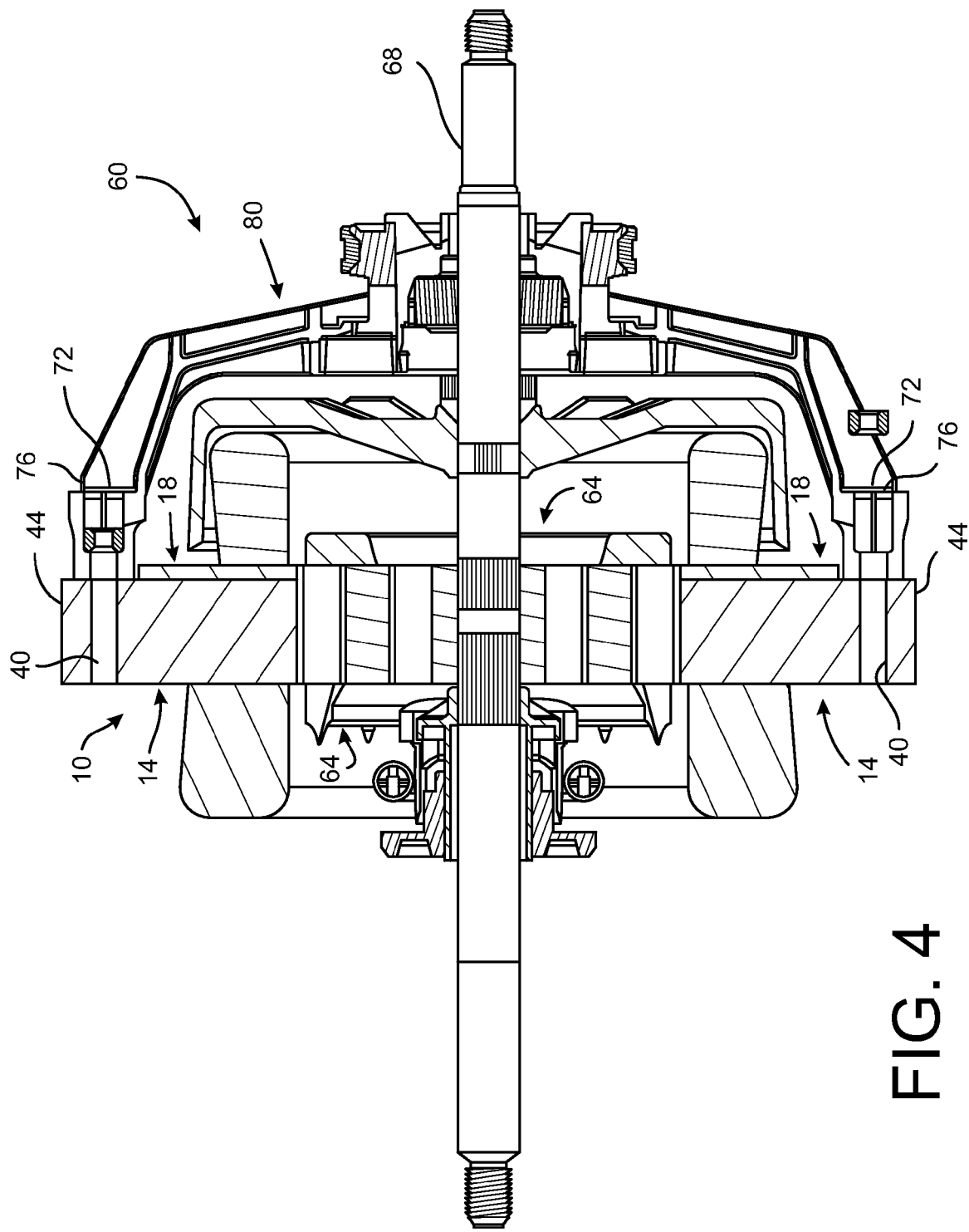
FIG. 4 is a cross-section view of a motor in which the stator of FIG. 1 is mounted.

A cross-sectional view of an electrical motor 60 with a stator 10 is shown in FIG. 4. The stator 10 is mounted about a rotor 64, which is mounted about output shaft 68. Bolts 72 extend through openings 76 in endplate 80 and the passageway formed by the aligned openings 40 in the laminations 22 of the base stack 14 to secure the stator 10 to the endplate 80. As can be seen from the figure, a portion of the endplate 80 about the opening 76 passes by the outer surface of add-on stack 18 so that portion contacts a face of stator 10 at flange 44 of the base stack 14. For an electrical motor of a different output rating, a different add-on stack 18 would be used, but it would still enable the portion of the endplate through which the mounting bolts 72 extend to pass by the add-on stack and contact the flanges 44 of the stator 10. Thus, the structure of the two stack stator enables electrical motors having different output ratings to have essentially the same hub-to-hub distance. Additionally, the scrap metal obtained from the removal of the flanges 44 from the add-on laminations can be recovered and sold to defray expenses in the manufacture of the different electrical motors.

Once a motor is assembled, maintenance of the air gap between the rotor and the stator is important. Movement of the stator that contacts or significantly changes the gap can adversely impact the ability of the motor to produce the proper torque. Previously known electrical motor endplates have included radial rib patterns in the endplate at the opening for the threaded member that engages the stator stack at the mounting holes in the first lamination. These ribs crush into a portion of the lamination to provide a frictional interference fit with the threaded member to help secure the stator stack to the endplate. By incorporating the three-legged star shape in the bolt hole at each corner of each stator lamination in the base stack as shown in FIG. 2, adequate clamping force is provided between the stator and the endplate with appropriately sized nuts and bolts, or possibly rivets or screws. A ring is also cast into the face of the endplate at the mounting hole so when the endplate is secured to stator the material forming the ring is crushed or deformed into the star shaped voids at the holes in the lamination. This frictional interference further enhances the stabilization of the stator about the rotor. While a three-legged star is shown extending the holes 40 in FIG. 2, other variations of hole extensions can be used to enhance the mechanical securing of the stator to the endplate to reduce the likelihood of the stator moving relative to the rotor.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A stator for an electrical motor comprising:
a first plurality of laminations, each lamination having a first outer perimeter with at least two flanges, each of the flanges in the at least two flanges in each lamination of the first plurality of laminations are adjacent to a cutout in the first outer perimeter of each lamination and each flange in the at least two flanges of each lamination having a mounting hole, the cutout being positioned outside of a yoke diameter of the laminations in the first plurality of laminations and a portion of each flange being within the yoke diameter of the laminations; and
a second plurality of laminations having a second outer perimeter that is different in shape than the first outer perimeter, the second outer perimeter of the laminations in the second plurality of laminations lacking the flanges having the mounting holes of the laminations in the first plurality of laminations and the portions of the flanges in the first plurality of flanges that are within the yoke diameter of the laminations in the first plurality of laminations to enable a portion of an endplate to pass the second plurality of laminations, contact a face of the first plurality of laminations, and enable a fastener to pass through the endplate and into the mounting holes in the flanges of the laminations in the first plurality of laminations.

2. The stator of claim 1, the first plurality of laminations has a greater number of laminations than a number of laminations in the second plurality of laminations.

3. The stator of claim 1 wherein the second outer perimeter of each lamination in the second plurality of laminations has at least a portion of the second outer perimeter lie within a yoke diameter of the stator.

4. The stator of claim 1 wherein the laminations of the second plurality of laminations have no mounting holes.

5. The stator of claim 1 wherein a height of the first plurality of laminations is more than twice a height of the second plurality of laminations.

6. The stator of claim 1, each mounting hole including hole extensions configured to weaken a portion of the lamination about each mounting hole in response to a threaded member passing through the mounting hole.

7. The stator of claim 6 wherein the hole extensions are configured in a three-legged star extension of the mounting hole.

8. An electrical motor comprising:
an output shaft;
a rotor mounted about the output shaft;
an endplate with an opening through which the output shaft extends; and
a stator secured to the endplate, the stator comprising:
a first plurality of laminations, each lamination having a first outer perimeter with at least two flanges, each of the flanges in the at least two flanges in each lamination of the first plurality of laminations are adjacent to a cutout in the first outer perimeter of each lamination and each flange in the at least two flanges of each lamination having a mounting hole, the cutout being positioned outside of a yoke diameter of the laminations in the first plurality of laminations and a portion of each flange being within the yoke diameter of the laminations; and
a second plurality of laminations having a second outer perimeter that is different in shape than the first outer perimeter, the second outer perimeter of the laminations in the second plurality of laminations lacking the flanges having the mounting holes of the laminations in the first plurality of laminations and the portions of the flanges in the first plurality of flanges that are within the yoke diameter of the laminations in the first plurality of laminations to enable a portion of an endplate to pass the second plurality of laminations, contact a face of the first plurality of laminations, and enable a fastener to pass through the endplate and into the mounting holes in the flanges of the laminations in the first plurality of laminations.

9. The electrical motor of claim 8, the first plurality of laminations has a greater number of laminations than a number of laminations in the second plurality of laminations.

10. The electrical motor of claim 8 wherein the second outer perimeter of each lamination in the second plurality of laminations has at least a portion of the second outer perimeter lie within a yoke diameter of the stator.

11. The electrical motor of claim 8 wherein the laminations of the second plurality of laminations have no mounting holes.

12. The electrical motor of claim 8 wherein a height of the first plurality of laminations is more than twice a height of the second plurality of laminations.

13. The electrical motor of claim 8, each mounting hole including hole extensions configured to weaken a portion of the lamination about each mounting hole in response to a threaded member passing through the mounting hole.

14. The electrical motor of claim 13 wherein the hole extensions are configured in a three-legged star extension of the mounting hole.

15. A method of making a stator for an electrical motor comprising:
interlocking a first number of laminations, each lamination having a first outer perimeter with at least two flanges, each of the flanges in the at least two flanges in each lamination of the first plurality of laminations are adjacent to a cutout in the first outer perimeter of each lamination and each flange in the at least two flanges of each lamination having a mounting hole, the cutout being positioned outside of a yoke diameter of the laminations in the first plurality of laminations and a portion of each flange being within the yoke diameter of the laminations to form a first stack for the stator;
interlocking a second number of laminations having a second outer perimeter that is different in shape than the first outer perimeter to form a second stack for the stator, the second outer perimeter of the laminations in the second stack lacking the flanges having the mounting holes of the laminations in the first plurality of laminations and the portions of the flanges in the first plurality of flanges that are within the yoke diameter of the laminations in the first plurality of laminations to enable a portion of an endplate to pass the second stack of laminations, contact a face of the first stack of laminations, and enable a fastener to pass through the endplate and into the mounting holes in the flanges of the laminations in the first plurality of laminations; and
interlocking the first stack of laminations to the second stack of laminations to form the stator.

16. The method of claim 15 wherein the first number of laminations is greater than the second number of laminations.

17. The method of claim 15 wherein the second outer perimeter of each lamination in the second stack has at least a portion of the second outer perimeter lie within a yoke diameter of the stator.

18. The method of claim 15 wherein the laminations of the second stack of laminations have no mounting holes.

19. The method of claim 15 wherein a height of the first stack of laminations is more than twice a height of the second stack of laminations.

20. The method of claim 15 further comprising:
forming the first number of laminations with mounting holes having three-legged hole extensions.

* * * * *